US006505779B1

(12) United States Patent
Power et al.

(10) Patent No.: US 6,505,779 B1
(45) Date of Patent: Jan. 14, 2003

(54) SECURITY DOCUMENT WITH SECURITY MARKING FORMED OF TRANSPARENT WINDOWS

(75) Inventors: Gary Power, Craigieburn (AU); Paul Zientek, North Carlton (AU)

(73) Assignee: Securency Pty Ltd, Craigieburn (AU)

( * ) Notice: Subject to any disclaimer, the term of this patent is extended or adjusted under 35 U.S.C. 154(b) by 0 days.

(21) Appl. No.: 09/600,273

(22) PCT Filed: Jan. 14, 1999

(86) PCT No.: PCT/AU99/00021

§ 371 (c)(1), (2), (4) Date: Apr. 9, 2001

(87) PCT Pub. No.: WO99/36271

PCT Pub. Date: Jul. 22, 1999

(30) Foreign Application Priority Data

Jan. 15, 1998 (AU) .............................................. PP1342

(51) Int. Cl.[7] ................................................ G06K 19/02
(52) U.S. Cl. ........................................ 235/488; 235/487
(58) Field of Search ................................ 235/488, 487, 235/489, 494; 283/57, 58, 93, 94, 107, 109

(56) References Cited

U.S. PATENT DOCUMENTS 4,522,428 A * 6/1985 Small et al. .................. 283/82
4,652,015 A 3/1987 Crane
4,941,687 A 7/1990 Crane
5,161,829 A 11/1992 Detrick et al.
5,449,200 A * 9/1995 Andric et al. ................. 283/67
5,830,529 A * 11/1998 Ross .......................... 101/211
5,915,731 A * 6/1999 Jackson ...................... 283/109
5,975,583 A * 11/1999 Cobben et al. ............... 283/93
6,062,604 A * 5/2000 Taylor et al. ............... 283/107
6,155,476 A * 12/2000 Fabel ........................ 229/92.3
6,209,779 B1 * 4/2001 Fabel ......................... 229/301
6,273,473 B1 * 8/2001 Taylor et al. ............... 283/107

FOREIGN PATENT DOCUMENTS

EP 0 453 131 10/1991
EP 0 518 740 12/1992
EP 0 628 408 12/1994
WO 97/05580 3/1996
WO 97/18092 3/1997

* cited by examiner

*Primary Examiner*—Diane I. Lee
(74) *Attorney, Agent, or Firm*—Christensen O'Connor Johnson Kindness PLLC

(57) ABSTRACT

Security document (1) with security indicia (21) for preventing unauthorised reproduction, the security indicia being detectable in transmitted light, wherein the security indicia are located within the bounds of a security pattern (20) acting to visually conceal the security pattern in reflected light. The security pattern may be formed of one or more elements (25) and may have a complexity selected to enable the concealment of the security indicia (21).

15 Claims, 2 Drawing Sheets

SECURITY DOCUMENT WITH SECURITY MARKING FORMED OF TRANSPARENT WINDOWS

This is a United States national stage application of International application No. PCT/AU99/00021, filed Jan. 14, 1999, the benefit of the filing date of which is hereby claimed under 35 U.S.C. §120, which in turn claims the benefit of Australian application No. PP 1342, filed Jan. 15, 1998, the benefit of the filing date of which is hereby claimed under 35 U.S.C. §119.

The present invention relates to security documents such as bank notes or the like with security indicia for preventing unauthorised reproduction of the security document, and is particularly concerned with security documents having security indicia which are detectable in transmitted light but are less apparent in reflected light.

BACKGROUND OF THE INVENTION

A wide variety of security devices or features for security documents, such as bank notes, traveller's cheques or the like have been proposed previously. Such security devices are provided in order to make falsification and counterfeiting of the security documents difficult.

Amongst those considered most effective for use in bank notes and like security documents are security devices which present authentication or security indicia in transmitted light but which act to make such authentication indicia less visible in reflected light. Many conventional security devices of this type, however, have the disadvantage of being difficult or complicated to produce or relatively easy to counterfeit.

U.S. Pat. No. 5,161,829, for example, describes a security paper including two layers of paper each having inner and outer surfaces and being of predetermined mechanical properties, colour and optical density. Authentication indicia are printed on the inner surface of one of the layers, and an adhesive permanently adheres the inner surfaces of the two layers together. The optical properties of both layers, of the adhesive and of the medium constituting the indicia are selected to render the security indicia detectable in transmitted light and substantially imperceptible in reflected light. Such an arrangement, however, is complex, costly to produce and restrictive in the choice of materials and colours which may be used in the production of bank notes to which such a security device is applied. None of the known security documents of the above mentioned type include a security device which is detectable in transmitted light and less evident in reflected light which is simple and convenient to manufacture and which does not unnecessarily limit or dictate the choice of materials used in the security document in which it is incorporated.

SUMMARY OF THE INVENTION

Accordingly, the present invention provides a security document with security indicia for preventing unauthorized reproduction, the security indicia being formed of at least partly transparent windows formed through the security documents and being detectable in transmitted light, wherein the security indicia are located within the bounds of a security pattern acting to visually conceal the security pattern in reflected light.

Preferably, the security pattern is formed of one or more elements and has a complexity selected to enable the concealment of the security indicia.

Various characteristics of the security pattern may be selected in order that an appropriate level of complexity to conceal the security indicia is achieved In one embodiment of the invention, the number of elementier unit area, or density of the elements, is selected to enable the concealment of the security indicia.

In addition, the irregularity of the security elements may be selected to enable such concealment One or more of the dimensions of the elements may be selected to enable such concealment.

Preferably, the security pattern is formed on a background surface by means of gravure, offset or intaglio printing techniques.

In at least one embodiment of the invention, the security pattern is formed on a background surface, the colours of the security pattern and the background being selected to contribute to the concealment of the security indicia Preferably, colours which are highly contrasting, and which thus act to confuse the eye of the viewer, will be chosen.

It is preferable that the security indicia themselves will also have a complexity selected to contribute to the concealment of the security indicia Such security indicia, for example, should preferably not be comprised of solid shapes such as circles or squares but should be more complex in form.

Preferably, the security indicia have a width and/or height in the plane of the security document of less than 2.5 mm.

Ideally, the security indicia and the security pattern will have similar complexities in order to optimise the concealment of the security indicia In at least one embodiment, the security document has a surface to which printed matter is applied, and an intaglio print is formed on the surface, the security indicia being located within the bounds of the intaglio print. The intaglio print, because of the height of the intaglio lines, acts to conceal the security indicia at oblique angles in reflected light.

In a preferred embodiment of the invention, the security document comprises an at least partially transparent substrate having first and second opposing faces, and one or more opaque layers applied to at least one of the faces. The windows may be comprised of apertures formed through one or more of the opaque layers.

The following description refers in more detail to the various features of the present invention. To facilitate an understanding of the invention, reference is made in the description to the accompanying drawings where the security document is illustrated in a preferred embodiment. It is to be understood that the security document of the present invention is not limited to the preferred embodiment as illustrated in the drawings.

DESCRIPTION OF THE PREFERRED EMBODIMENT

Figure 1:
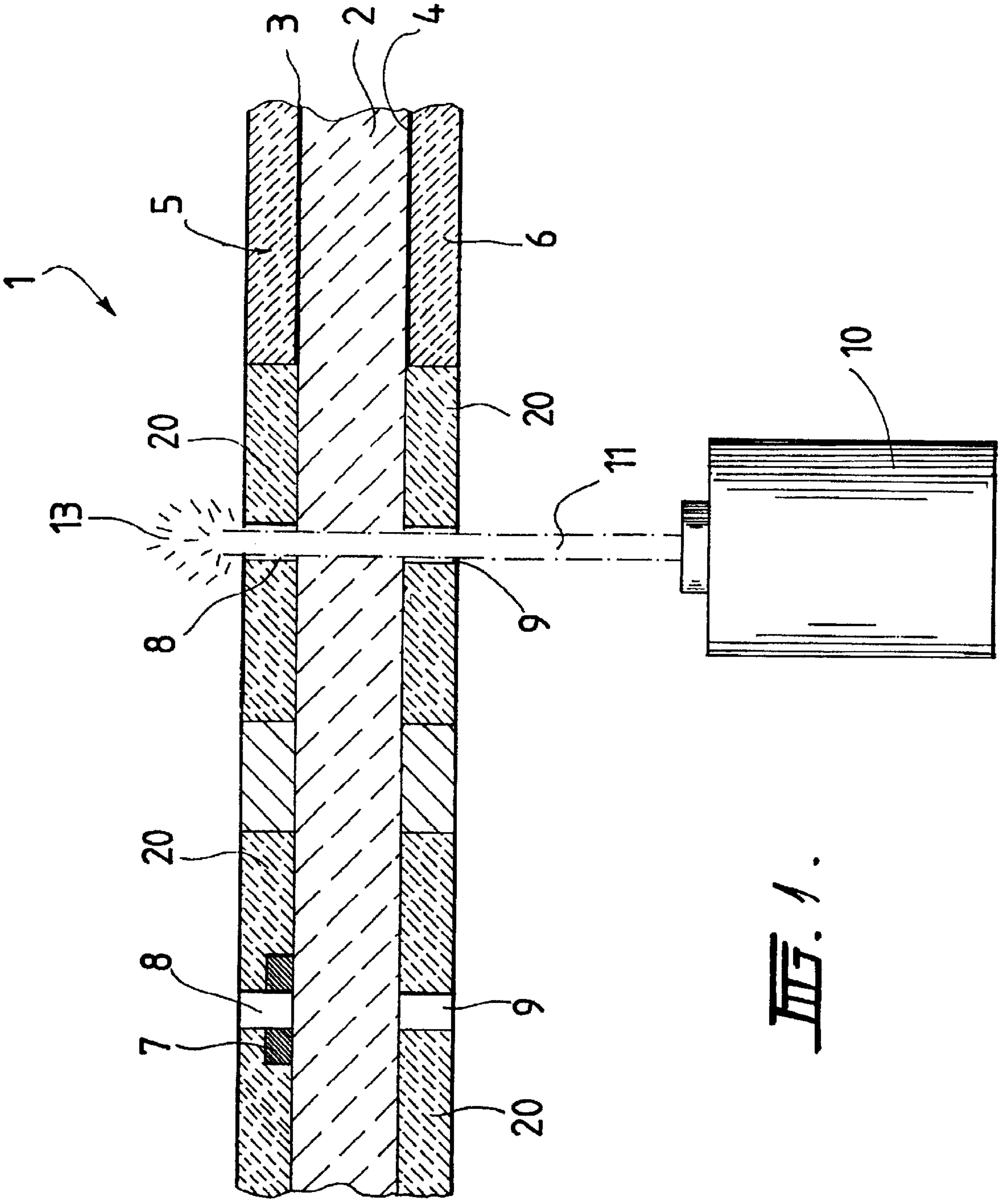
FIG. 1 is a schematic diagram showing a laser beam acting on a security document of the present invention to form security indicia.

Referring now to FIG. 1, there is shown a cross-sectional side view of a security document 1 comprising an at least partially transparent substrate 2 having first and second opposing faces 3 and 4. Opaque layers 5 and 6 are respectively applied to the faces 3 and 4 of the substrate 2.

The security document 1 may be a bank note comprising a clear plastic substrate having one or more opacifying layers of ink on one or both its opposing faces. The clear plastics substrate is preferably formed of a transparent polymeric material, such as PE, PP or PET, which may be made up of at least one biaxially oriented polymeric film. The substrate may comprise a single layer film of polymeric material. Alternatively, the substrate may comprise a laminate of two or more layers of transparent biaxially oriented polymeric film.

The opacifying layers of printed matter may comprise any one or more of a variety of opacifying inks which can be used in the printing of bank notes or other security documents. For example, the layers of opacifying ink may comprise pigmented coatings comprising a pigment, such as titanium dioxide, dispersed within a binder or carrier of cross-linkable polymeric material. The opacifying layers may also comprise offset or intaglio printed components.

The security document 1 may additionally or alternatively include an optically variable device 7 or other object within one or more of the layers of opacifying ink.

The security document 1 includes security indicia for preventing the unauthorized reproduction of the security document. Such security indicia may be formed of at least partly transparent windows through the security document 1. By way of example, superposed apertures or openings 8, 8' and 9, 9' may respectively be formed through the opacifying ink layers 5 and 6 such that light may be transmitted through the security document 1.

Such at least partly transparent windows may be formed in a variety of ways. According to one technique described in co-pending Australian Patent Application PO5239 by the present applicant, a laser source 10 emits a continuous or pulsed beam 11 of laser light that impinges on and acts on one side of the security document 1. The beam 11 initially contacts the opaque layer 6 leading to localised heat build up in the layer due to the absorption of radiation by that layer.

Eventually the internal bonds and cohesive forces of the layer structure weaken and break down leading to ablation or removal of particles 12 of layer 6. The laser beam 11, having completely penetrated the layer 6, travels through the transparent substrate 2 substantially unimpeded until it impinges on the surface of layer 5 located on the other side of the security document 1. Little or no absorption of the radiation takes place while the beam 11 travels through the substrate 2 and hence no or little heat build up or consequential damage to the film occurs. When the laser beam 11 impinges on the layer 5 a similar ablation process occurs whereby particles 13 are removed from the surface thereof as with layer 6. This leaves a clear or transparent area which is in register on both surfaces of the substrate 2 in the shape of the desired security indicia or security indicia element.

By appropriate selection of their size, form and relative spacing, the transparent windows thus form security indicia which may be readily viewed in transmitted light, but which arc less apparent to an observer in reflected light conditions.

It should be appreciated that the formation of such at least partially transparent windows is merely one example of security indicia which may be applied to or formed in or on the security document 1. Other security indicia, such as printed characters, bar codes and other optically detectable devices may be also be used to create suitable security indicia.

Figure 3:
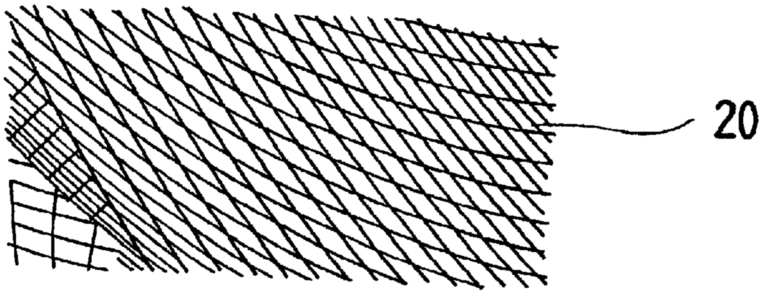
FIG. 3 is a diagram of a portion of a security document according the present invention when viewed in reflected light.
Figure 4:
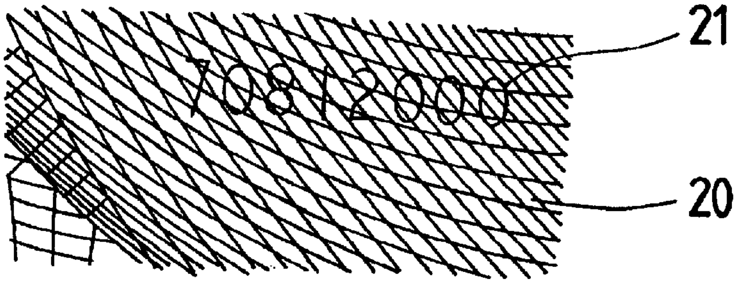
FIG. 4 is a view of that portion of a security document shown in FIG. 3 when viewed in transmitted light.

The present invention relies on the principal that it is possible to hide or conceal small amounts of information within larger and visually confusing information structures. Accordingly, and as shown in FIGS. 3 and 4, the security document 1 additionally includes a security pattern or patterns 20 applied to or formed in or on the security document 1 such that the security indicia are located within the bounds of the security pattern.

In the present example, the security pattern 20 is printed on to the surface 3 of the substrate 2 of the security document 1, the security pattern 20 constituting part of the printed ink layer 5.

Various characteristics of the security pattern 20 may be selected so that the security pattern acts to visually conceal the security indicia in reflected light. One of the principal characteristics of the security pattern 20 which may be so selected is its complexity. In this sense, complexity may be defined as the visual confusion or distraction that such a security pattern causes to the eye of a person viewing the security document 1 in reflected light conditions.

The complexity of any given security pattern will be dependent upon the security indicia which the security pattern is acting to conceal. FIG. 4 shows security indicia 21 consisting of a series of eight transparent windows formed through the security document 1 in the above described manner, each transparent window having tie form of a numeral. The complexity of the security pattern 20 has been selected so that in reflected light the security indicia 21 are masked or concealed from inspection in reflected light. Several characteristics or qualities of the security pattern 20 may be selected in order to achieve such optimal complexity. Firstly, the density of the various elements constituting the security pattern may be selected. That is to say, the security pattern 20 may be formed of one or more elements, in this case a series of intersecting lines, which form a grid of slightly curved diamond shapes between such lines. The density or number of lines per unit area of the security pattern may in this case be selected so that, for example, the spacing between the lines approximately corresponds to the spacing between various elements of the security indicia. In the example shown in FIG. 4, it can be seen that the width of each of the numerals and the separation between the lines constituting the numerals approximately corresponds to the separation between the elements or lines forming the security pattern 20.

In addition, the irregularity of the elements constituting the security pattern 20 may be selected to enhance the concealment of the security indicia 21. The eye of an observer is less able to visually block or mask a regular pattern than an irregular pattern. From FIG. 4, it can be seen that both the horizontal and vertical lines or elements constituting the security pattern 20 are irregularly curved in order to enhance the concealment of the security indicia 21.

In addition, one or more of the dimensions of the elements or lines constituting the security pattern 20 may be selected to further enhance the security indicia concealment. In the example shown, the thickness of the lines has been chosen to approximately correspond to the thickness of the transparent windows constituting the numerals of the security indicia. Alternatively, the security indicia may be located between adjacent elements of the security pattern 20 and the thickness of the security pattern elements increased so that the pattern itself dominates the eye and acts to hide the security indicia.

In addition to the complexity of the security pattern 20, the colour of the security pattern with respect to the background upon which it is viewed can be selected to further enhance concealment. Preferably, colours having a high contrast therebetween or, which otherwise act to create visual confusion when viewed side-by-side, will be selected.

Generally, the transparent windows produce the impression of a clear or light colour when viewed in reflected light. Accordingly, it is preferable that either the background or the security pattern itself are formed in a similar light or clear colour, whilst the other is formed in a highly contrasting colour.

Figure 2:
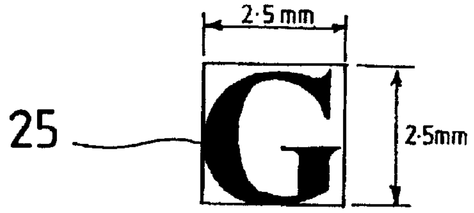
FIG. 2 is a diagram of one sort of security indicia for use with a security document of the present invention.

The concealment of the security indicia is also enhanced if the security indicia 21 themselves have a certain complexity. Preferably, the security indicia should not be comprised of solid shapes such as squares, ovals, circles or rectangles because such security indicia are easy to view in reflected light. Rather, the security indicia or window design should have some complexity of its own and the area occupied by the security indicia be substantially less than the total height multiplied by the total width of the security indicia. This can be best seen in FIG. 2, where a security indicia element 25, in the form of a letter "G", is shown. It can be seen that the overall area occupied by the security indicia element 25 is substantially less than the height multiplied by the width of the element.

Preferably, the security indicia should have a height and/or a width in the plane of the security document of at least 2.5 mm, practical experimentation having shown that security indicia elements having a dimension greater than 2.5 mm are relatively easily discernible in reflected light It is also beneficial to the concealment of the security indicia if the security indicia are placed in areas where there is intaglio printing. Intaglio printing involves the printing of a pattern with either non-reflective or possibly reflective intaglio ink or inks onto a substrate, such as paper or other surface, so that an embossed or raised effect is achieved without the creation of stress on the substrate. The production of printed matter including such intaglio printing is described in co-pending Australian Patent Application No. PO4847 by the present applicant. The utilisation of reflective ink permits light to be reflected off the sides of each of the raised impressions. In the context of the present invention, the height of the raised portions of the printed patterns aids in concealing the security indica when the document is viewed at oblique angles. Accordingly, in order to be able to detect the security indicia 21, it will be necessary to view the security document 1 substantially perpendicularly to the plane of the security document.

It will also be appreciated that various modifications and alterations may be made to the present invention described above without departing from the scope and spirit of the invention.

What is claimed is:

1. Security document with security indicia for preventing unauthorised reproduction, the security indicia being formed of at least partly transparent windows formed through the security document and being detectable in transmitted light, wherein the security indicia are located within bounds of a security pattern acting to visually conceal the security indicia in reflected light, the security pattern being formed of one or more elements and having a complexity selected to enable the concealment of the security indicia.

2. Security document according to claim 1, wherein the number of elements per unit area is selected to enable the concealment of the security indicia.

3. Security document according to either of claim 1 or 2, wherein the elements have an irregularity selected to enable the concealment of the security indicia.

4. Security document according to claim 1, wherein dimensions of the one or more elements are selected to enable the concealment of the security indicia.

5. Security document according to claim 1, wherein the security pattern is formed on a background surface by means of gravure printing.

6. Security document according to claim 1, wherein the security pattern is formed on a background surface by means of offset printing.

7. Security document according to claim 1, wherein the security pattern is formed on a background surface by means of intaglio printing.

8. Security document according to claim 1, wherein the security pattern is formed on a background surface, the security pattern and the background having colours being respectively selected to contribute to the concealment of the security indicia.

9. Security document according to claim 8, wherein the colours respectively of the security pattern and the background are highly contrasting and act to visually confuse a viewer.

10. Security document according to claim 1, wherein the security indicia have a complexity selected to contribute to the concealment of the security indicia.

11. Security document according to claim 10, wherein the security indicia are comprised of solid shapes of greater complexity than simple circles or squares.

12. Security document according to either one of claims 10 or 11, wherein the security indicia have a width and height in the plane of the security document of less than 2.5 mm.

13. Security document according to claim 1, wherein the security indicia and the security pattern have similar complexities in order to optimise the concealment of the security indicia.

14. Security document according to claim 1, wherein the security document has a surface to which printed matter is applied, and an intaglio print is formed on the surface, the security indicia being located within bounds of the intaglio print.

15. Security document according to claim 1, comprising an at least partially transparent substrate having first and second opposing faces, and one or more opaque layers applied to at least one of the faces, said windows being comprised of apertures formed through one or more of the opaque layers.

* * * * *